US008063749B2

(12) United States Patent
Rye et al.

(10) Patent No.: US 8,063,749 B2
(45) Date of Patent: Nov. 22, 2011

(54) MULTIFUNCTIONAL TWO-WAY REMOTE CONTROL DEVICE

(75) Inventors: David J. Rye, Kent, WA (US); Leslie A. Leech, Kowloon (HK); James R. W. Phillips, Bellevue, WA (US)

(73) Assignee: X10 Ltd., Hunghom Kowloon (HK)

( * ) Notice: Subject to any disclaimer, the term of this patent is extended or adjusted under 35 U.S.C. 154(b) by 981 days.

(21) Appl. No.: 11/383,710

(22) Filed: May 16, 2006

(65) Prior Publication Data

US 2007/0279247 A1 Dec. 6, 2007

(51) Int. Cl.
*G05B 11/01* (2006.01)
*G08C 19/12* (2006.01)

(52) U.S. Cl. ................. 340/12.5; 340/13.24; 340/13.26; 340/12.22

(58) Field of Classification Search ............. 340/825.72, 340/825.69, 10.4, 10.1, 5.82; 341/176; 398/106, 398/115; 455/74, 414.1; 713/185; 710/73, 710/106; 348/61, 143

See application file for complete search history.

(56) References Cited

U.S. PATENT DOCUMENTS 4,511,886 A * 4/1985 Rodriguez .................... 340/534
6,091,882 A * 7/2000 Yuen et al. ....................... 386/83
6,127,941 A * 10/2000 Van Ryzin ................... 340/4.37
6,208,384 B1 * 3/2001 Schultheiss ................... 348/552
6,255,961 B1 * 7/2001 Van Ryzin et al. ............ 340/3.1
6,570,524 B1 * 5/2003 Mullaly et al. ................ 341/176
6,690,392 B1 * 2/2004 Wugoski ....................... 715/744
6,728,585 B2 * 4/2004 Neoh .............................. 700/94
6,970,098 B1 * 11/2005 Adams et al. ............ 340/825.69
7,005,966 B1 * 2/2006 Leman et al. ................ 340/10.4
7,006,006 B2 * 2/2006 Witkow et al. ........... 340/825.25
7,012,653 B1 * 3/2006 Strickland et al. ............ 348/731
7,113,091 B2 * 9/2006 Script et al. .................... 340/546
7,453,371 B2 * 11/2008 Niyama et al. ........... 340/825.72
2002/0071577 A1 * 6/2002 Lemay et al. ................. 381/110

FOREIGN PATENT DOCUMENTS

WO 0175837 A2 10/2001

* cited by examiner

*Primary Examiner* — Nam V Nguyen
(74) *Attorney, Agent, or Firm* — Lowe Graham Jones PLLC

(57) ABSTRACT

A remote control device for communicating between a computer system and a plurality of electronic devices. The remote control device includes a radio frequency (RF) transmitter, a RF receiver, an optical transmitter, a memory unit, and a processor in data communication with the memory unit, the RF transmitter, the RF receiver, and the optical transmitter. The processor includes a first component that instructs the optical transmitter to emit at least one signal in response to information received by the RF receiver from a computer.

6 Claims, 10 Drawing Sheets

MULTIFUNCTIONAL TWO-WAY REMOTE CONTROL DEVICE

FIELD OF THE INVENTION

This invention relates generally to remote control devices and, more specifically, to programmable remote control devices.

BACKGROUND OF THE INVENTION

There exist remote control devices that typically only are used for controlling electronic appliances, but are limited in their abilities to provide users with a broad range of other capabilities.

Therefore, there exists a need to provide users with a broad range of capabilities in a remote control device.

SUMMARY OF THE INVENTION

A remote control device includes a radio frequency (RF) transmitter, a RF receiver, an optical transmitter, a memory unit, and a processor in data communication with the memory unit, the RF transmitter, the RF receiver, and the optical transmitter. The processor includes a first component that instructs the optical transmitter to emit at least one signal in response to information received by the RF receiver from a computer.

In one aspect of the invention, the remote control device includes an operator interface having buttons. The processor instructs the RF transmitter to send a code to the computer in response to activation of a button. The information received by the RF receiver is in response to the sent code.

In another aspect of the invention, the processor instructs the optical transmitter to emit a first signal to a first device and a second signal to a second device in response to information received by the RF receiver.

In still another aspect of the invention, the remote control device includes a microphone in data communication with the processor and a speaker in data communication with the processor. The processor instructs the speaker to emit sound in response to an audio signal received by the RF receiver from the computer and instructs the RF transmitter to send audio information in response to a signal generated by the microphone.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
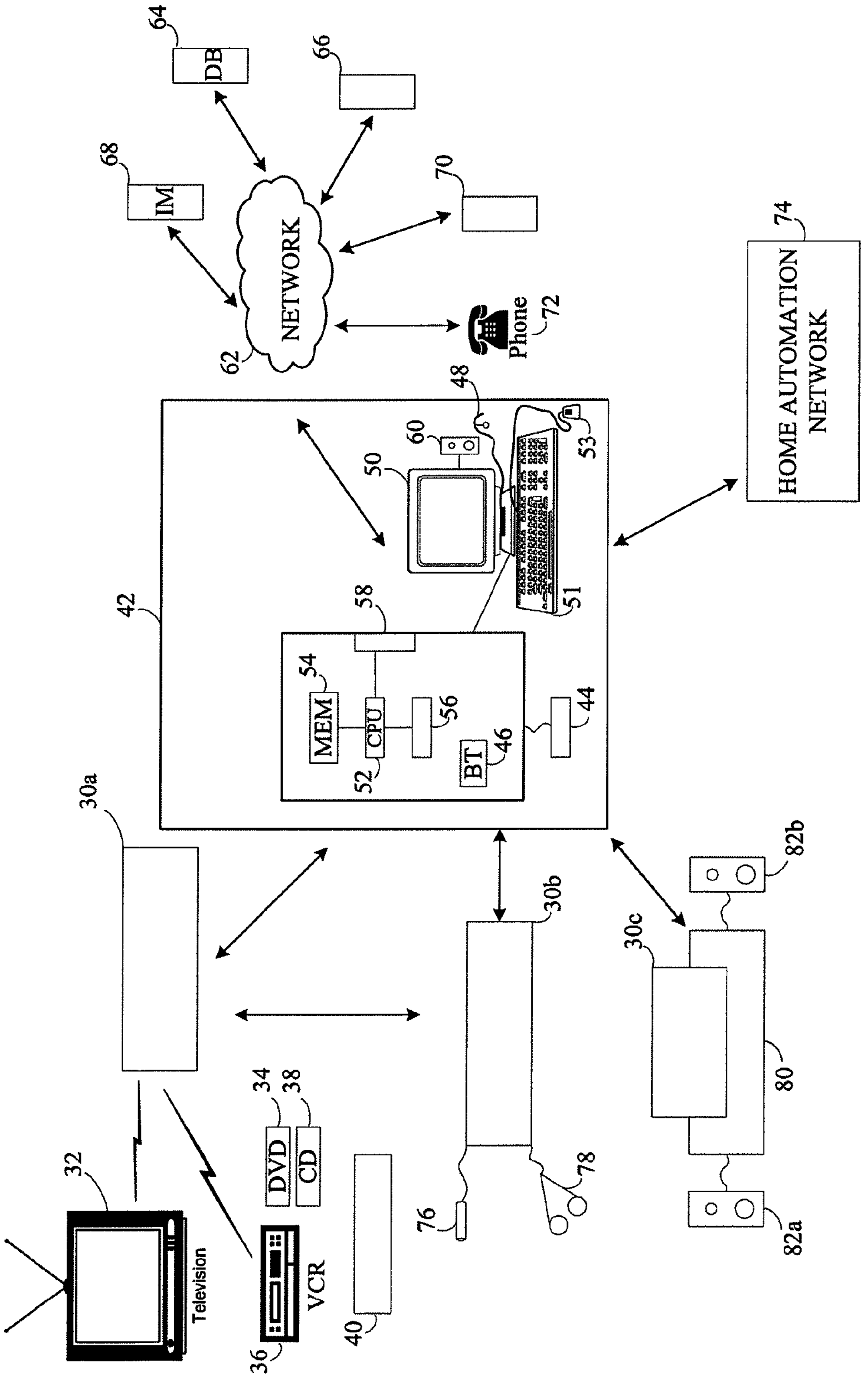
FIG. 1 is a diagram showing an example environment of an embodiment of the invention.

FIG. 1 is a diagram showing an example environment of an embodiment of the invention. Three example multifunctional two-way remotes are shown to illustrate alternate forms of preferred configurations of the invention. These are shown as a first remote 30*a*, a second remote 30*b*, and a third remote 30*c*. In accordance with this invention, various features from any of these embodiments may be incorporated into the other embodiments.

The two-way remotes 30*a*, 30*b*, and 30*c* may direct home electronics appliances to operate via optical communications such as infrared (IR) control. This is shown by the first remote 30*a* transmitting commands to a television 32, a DVD player 34, a videocassette recorder 36, a CD player 38, or an additional home electronics device 40. The additional home electronics device 40 may be a cable box, for example. Although not shown, the remotes 30*b* and 30*c* communicate with home electronics appliances in a similar manner. Each of the remotes 30*a*, 30*b*, and 30*c* may be programmed with individualized program sets for different users. For example, the remotes 30*a*, 30*b*, and 30*c* can have different favorite channels automatically programmed or they can play different sounds for different users. They can also be programmed to respond differently to alerts that may be transmitted to them.

The first, second, and third remotes 30*a*, 30*b*, and 30*c* preferably interact with a computer 42 that includes standard computer components such as a central processing unit (CPU) 52, a computer memory 54, a secondary storage medium 56, a network connection 58, a display 50, a keyboard 51, and a mouse 53 or other directional input device. In the example shown, the computer 42 also includes a first microphone 48, a computer speaker 60, and a transceiver, such as a WiFi transceiver 44, or a Bluetooth transceiver 46. The WiFi transceiver 44 is based on industry standard 802.11a, b, or g, for example. The remotes 30*a*, 30*b*, and 30*c* have a plurality of buttons (not shown) for triggering various functions. The functionality of the buttons on the remotes 30*a*, 30*b*, and 30*c* may be programmed by using the computer 42 to communicate with one of the remotes using WiFi, Bluetooth, wireless USB, proprietary communications transmissions, or some combination thereof. In one embodiment, 900 MHz wireless USB communications are used and the remote 30*a*, 30*b*, or 30*c* includes a bi-directional USB transceiver.

The information to be stored in the remote 30*a*, 30*b*, or 30*c* for each button may come from software installed on the computer 42, which instructs the CPU 52 to transmit the proper codes to one or more of the first, second, and third remotes 30*a*, 30*b*, and 30*c* when location information such as a U.S. postal zip code and electronics component information are entered in the computer 42. In some embodiments, the computer 42 queries the remote 30*a*, 30*b*, or 30*c* for a model number of the remote before sending button programming information, so that the computer 42 is able to send codes which will work on the particular model of the remote if they are different from other remotes. Also, in some embodiments, the remote 30*a*, 30*b*, or 30*c* may have an additional identification number which is transmitted to the computer 42 to allow the computer 42 to distinguish between multiple similar remotes being used in a single household or business environment. Additionally, information associated with the remote 30*a*, 30*b*, or 30*c* may be retrieved from a database 64 residing on a server of either the manufacturer of the first, second, and third remotes 30*a*, 30*b*, and 30*c*, or a server of a third party. The remote information is transmitted and received via a public or private network 62, such as the Internet for example.

The codes transmitted from the computer 42 to the remote 30*a*, 30*b*, or 30*c* may be IR codes in some embodiments, or codes corresponding to certain key offsets to a code list stored in Read only Memory (ROM) of the remote 30*a*, 30*b*, or 30*c* in other embodiments. An example of a key offset is an offset from a starting point of the memory. Additionally, in some embodiments, codes for proper key presses are determined by the computer 42 and/or a server 66 accessed via the network 62 based only on location information without need for electronics component information to be entered. If codes are determined only based on location information, the remote is also programmed by learning the IR signals of existing remotes. For example, learning the IR signals of existing remotes can be accomplished by entering a learning mode on the remote 30*a*, 30*b*, or 30*c* and pressing a key to be learned while at the same time pressing the corresponding key to be learned on the existing remote. In some embodiments, the functionality of the remote 30*a*, 30*b*, or 30*c* may be changed by updating the controlling software residing on the computer 42. When installed, the updated software sends commands which reprogram the remote 30*a*, 30*b*, or 30*c* if necessary.

The remotes 30*a*, 30*b*, and 30*c* are optionally programmed with smart macro technology such that a variety of functions are performed with a limited number of button presses. For example, a function assigned to a button on the remote will turn on the stereo, switch to DVD-in, turn on the television, switch to input b, and set the volume at a preset level. An example method of implementing this technology is described in U.S. Pat. No. 6,998,997 which is incorporated herein by reference. However, in other embodiments, the smart macro functionality is controlled mainly by the computer 42. In embodiments where macros are implemented using the computer 42, the proper sequence of actions to take are stored in the computer 42 rather than in the remote 30*a*, 30*b*, and 30*c*. Pressing a button which is intended to launch a macro on the remote 30*a*, 30*b*, or 30*c* causes an RF signal to be sent to the computer 42, and the computer determines the proper actions to take based on previously stored actions. Since it is an RF signal being sent in response to the button press rather than an IR signal, the functionality relating to IR communications of the remote 30*a*, 30*b*, or 30*c* is not directly caused by the button press in these instances but is directed by logic residing on the computer 42. In some embodiments, all direct IR functionality could be disabled, even for buttons not intended to launch macros, with the direction for which signals to send coming entirely from the computer 42. The computer 42 then sends either the IR codes themselves to the remote, or preferably a key sequence that will cause the desired actions to occur. Delay times are also sent in some embodiments so that multiple IR signals are not sent by the remote 30*a*, 30*b*, or 30*c* too quickly. In other embodiments, the computer 42 sends the IR codes or keys in the key sequence to the remote 30*a*, 30*b*, or 30*c* with a delay between each IR code or key sent. The remote 30*a*, 30*b*, or 30*c* then emits the proper IR signals based on the information sent to it by the computer 42. Direct IR functionality may be completely disabled as described above so that button presses on the remote 30*a*, 30*b*, or 30*c* always cause an RF signal to be sent to the computer 42 rather than causing an IR signal to be sent without sending an RF signal to the computer, and the remote 30*a*, 30*b*, or 30*c* emits IR signals only in response to information received at the remote 30*a*, 30*b*, or 30*c* from the computer 42. In another embodiment, disabling may be performed only for the functionality associated with some buttons and not others, or may be temporarily disabled by entering a mode for using functions directed by the computer 42 rather than the remote 30*a*, 30*b*, or 30*c*.

The first, second, and third remotes 30*a*, 30*b*, and 30*c* are also capable of a variety of other functions. For example, the second remote 30*b* is shown with an external microphone 76 and a speaker (not shown) or pair of headphones 78 attached to the remote 30*b*. Note that the microphone 76 is shown as extending via wires from the remote for illustrative purposes, but may alternatively be built into the remote housing in an aesthetically pleasing configuration. The headphones 78 may be used to listen to audio content stored on the computer 42. The audio content could be MP3 files or other digitally stored media or could also be digitally transmitted analog audio such as WAV files. These audio streams would be transmitted via the WiFi transceiver 44, or alternatively via an alternative wireless communications means. In addition to listening to audio, the second remote 30*b* may also record audio communications using the external microphone 76 to receive the audio to be stored on the computer 42 either in the computer memory 54 or the secondary storage media 56. Alternatively (or in addition), the second remote 30*b* is able to store a limited amount of recorded audio in the remote itself when the computer 42 is turned off or communications are interrupted. This stored audio content may then later be transmitted and stored in the computer 42 if desired. The third remote 30*c* is shown seated in a cradle 80, which is attached to a speaker 82*a* and a speaker 82*b*. Although it was already mentioned that audio may be listened to via the headphones 78, it may also be desirable for audio to be heard openly. In this instance, the speakers 82*a* and 82*b* allow for greater amplification of the audio stream transmitted to the remote 30*c*. In addition, the cradle 80 may allow for other functionality such as recharging the batteries of the remote 30*c*.

Although not shown, the first, second, and third remotes 30*a*, 30*b*, and 30*c* may also (or alternatively) have an integrated microphone and an integrated speaker so that an external microphone and speaker, although useful in some cases, are not necessary to use the audio functionality of the remotes. The integrated microphone and speaker allow bi-directional audio communications with the computer 42. In addition to communicating solely with the computer 42 located nearby, the remotes 30*a*, 30*b*, and 30*c* may also communicate with other devices, content providers, and service providers via the network 62 such as the Internet via the computer 42. For example, one of the remotes could receive alerts from an instant messaging (IM) client 68 by being notified by the computer 42 when a message was received. Additionally, if the remotes were provided with a display, such as an LCD, the remotes may be able to display information retrieved from a content provider via the network 62 by software residing on computer 42 and transmitted via the WiFi transceiver or other wireless communications means to one of the remotes at a convenient location.

The remotes 30*a*, 30*b*, and 30*c* may also be configured to interact with a home automation network 74 via the computer 42, as is shown in FIG. 1. For example, if a door in the home had been left ajar, a sensor (not shown) connected to the home automation network 74 on or near the door may emit a signal indicating the door had been left open and the home automation network 74 may send an alert based on the signal emitted by the sensor which would be recognized by a program residing on the computer 42, and the alert would be transmitted to the remote via WiFi or other communication means. In other embodiments, the remotes 30*a*, 30*b*, and 30*c* are programmed to transmit signals that will be recognized by the home automation network 74 to control other types of functions such as by triggering ActiveHome Pro macros or other home automation functions used in the ActiveHome Pro product manufactured by X10 Wireless Technology, Inc. or any other home automation functions present in other home automation products. Another example of integration with the home automation network 74 includes using a motion sensor (not shown), which is a part of the home automation network 74, to send a notification to the computer 42 that something is occurring in the vicinity of a security camera. After receipt of the notification, the computer 42 transmits a code to the remote 30*a*, 30*b*, or 30*c*, which causes the optical transmitter to cause the television 32 to display an image from the security camera on the television 32. In some embodiments, this would be done using picture-in-picture (PIP) functionality of the television 32. The video signal from the security camera would be routed to the television 32 using the computer 42 or alternatively by using existing elements of the home automation network 74 (not shown).

The remotes 30*a*, 30*b*, and 30*c* may also be used as converters of RF signals to IR signals. As an example, the remotes 30*a*, 30*b*, or 30*c* could be used in a manner similar to an RF receiver and IR transmitter type of Powermid device, with the RF signals being generated by the computer 42 or by the IR receiver and RF transmitter type of Powermid device. Powermid devices are manufactured by X10 Wireless Technology, Inc. and, among other things, enable the range of optical remote control devices to be extended by converting IR signals from an optical remote control device to RF signals at a transmitter type Powermid device, receiving the RF signals produced by the transmitter type Powermid device at a receiver type Powermid device, and converting the received RF signals into IR signals to be used in the control of electronic devices.

The remotes 30*a*, 30*b*, and 30*c* may also be used as internet protocol (IP) telephone devices. In one embodiment, the remotes 30*a*, 30*b*, and 30*c* have the ability to both transmit and receive audio communications with a phone 72 at another location using the computer 42. For IP telephony data received from the phone 72, the computer 42 converts the data to a form that can be interpreted as audio by the remote 30*a*, 30*b*, or 30*c* and transmits the audio to the remote 30*a*, 30*b*, or 30*c* using an RF signal. For audio information received transmitted by the remote 30*a*, 30*b*, or 30*c* as an RF signal during an IP telephone call, the computer 42 receives the RF signal, converts the audio information to IP telephony protocol data packets, and sends them to the phone 72. For example, the remote 30*a*, 30*b*, or 30*c* could function as a handset for Skype or another IP telephony provider. A button may be pressed to take a call, and other buttons could be programmed for quick dial of Skype contacts. If a call was received, the computer 42 could cause the remote 30*a*, 30*b*, or 30*c* to decrease the volume or mute any music or video that may be playing, and possibly pause any recorded programs before presenting an alert that a call is coming in and possibly a caller ID shown via an optional LCD or read through a text-to-speech conversion. The IP telephone functionality of the remote 30*a*, 30*b*, or 30*c* can also be used to send and receive faxes in some embodiments.

The remotes 30*a*, 30*b*, and 30*c* may also receive any of a variety of other types of alerts sent via the computer 42 as well. These alerts could notify the user of the remotes in a variety of ways. For example, an alert will trigger a light emitting diode (LED) to be illuminated on a remote, trigger a sound or voice alert via the integrated or attached external headphones or speaker, or cause a message to be displayed on an optional display. Some examples of items that may optionally be programmed to trigger alerts include updates or changes to sports scores, weather reports, news filters, RSS feed monitors, BLOG monitors, and stock quotes that are received at the computer 42 via the network 62. Other alerts are generated within the computer 42 itself, and include download completion notices, received emails, calendar meeting or appointment notifications such as a dentist appointment or soccer practice time, routine alarms, and countdown timers that had been previously set. Calendar alerts may be for Outlook calendar or Yahoo calendar for example. The alerts for received emails may be configured using filters for specific senders or content. The remote 30*a*, 30*b*, or 30*c* then notifies the user only when an email fitting the rule is received. Alerts may also be set for auction changes, such as for changes that occur in a particular eBay auction. The auction alerts notify when someone has outbid the user or when a predetermined number of minutes were remaining until the end of an auction, for example. Certain sounds or sound bites similar to telephone ring tones may also be downloaded from the computer 42 to the remotes 30*a*, 30*b*, and 30*c* which allows the remote to play the user's favorite jingles when certain alerts are received or certain functions of the remote are accessed.

As an additional example, the remotes may be used to activate information that is transmitted to a service provider 70. For example, software residing on the computer 42 may store the website url, email or IM address of a favorite pizza delivery service along with a favorite pizza to be ordered. This information is sent to the pizza delivery service simply by pressing a button on the remote. Any user names and passwords required for interacting with the pizza web site could also be stored and triggered by pressing the order pizza button. This could alternatively be accomplished by using the IP phone functionality of the remote, accomplished as discussed above.

Additionally, if multiple remotes are present, the remotes may be used to communicate directly with each other. This is shown by the link between the first remote 30*a* and the second remote 30*b* shown in FIG. 1. The remotes 30*a* and 30*b* can be used in this manner in walkie-talkie fashion, where a user of the first remote 30*a* can speak with a user of the second remote 30*b* so long as they are within reception range of the communication means whether that be WiFi or other RF communications means present on the remotes.

In some embodiments, many functions are controlled by the computer 42. For example, a user may indicate a desire to change channels at the end of a program by pressing a certain key combination on the remote 30*a*, 30*b*, or 30*c*. In some embodiments this is done by pressing the next channel button twice, such as by pressing the HBO key twice to change to the HBO channel after CNN's world news finishes. This key press sequence causes an RF signal to be transmitted from the remote 30*a*, 30*b*, or 30*c* to the computer 42. The computer 42 interprets the signal as a desire to change channels after the current program finishes. The computer 42 then looks to programming guide information, either locally stored or via a network to determine when the current CNN program ends. After the program ends, the computer 42 sends the appropriate signal to the remote 30*a*, 30*b*, or 30*c* to change to the HBO channel at that time. The remote 30*a*, 30*b*, or 30*c* then emits the proper IR signal to cause a channel change on the television 32. Another example of functionality largely directed by the computer 42 is for the computer to learn the viewing habits of a user and control home electronics appliances such as the television 32 and the additional home electronics device 40 based on the learned viewing habits. In some embodiments, the computer 42 learns the viewing habits of a user by receiving a channel number that is sent to the computer 42 via RF when a button is pressed on the remote 30*a*, 30*b*, or 30*c* to change the channel. In other embodiments, the computer 42 sends a channel number to the remote 30*a*, 30*b*, or 30*c* via RF and the remote 30*a*, 30*b*, or 30*c* sends the desired channel to the television 32 via IR, resulting in the computer 42 having a record of the channel number.

In another embodiment, the remotes 30*a*, 30*b*, and 30*c* display or sound an alert when a button on the computer 42 is pressed which had been previously designated as a "Find Me" button. The functionality could also include the ability to play a previously recorded audio clip at the press of a button on the remote 30*a*, 30*b*, or 30*c*. For example, a user in Chicago may store an audio file on the computer 42 that is a recording of someone exclaiming, "Goal Bulls!". The user then assigns a button on the remote to correspond to this stored audio file. While watching a game with friends, the user can press the assigned button, which causes the remote 30*a*, 30*b*, or 30*c* to send a signal to the computer 42 that the button has been pressed. In response, the computer 42 transmits the audio file to the remote 30*a*, 30*b*, or 30*c* where it is played through the internal speaker, or in some cases via the external headphones 78 or speakers 82*a* and 82*b*. The audio file may be transmitted on a separate audio channel directly from a sound card residing in the computer 42 or may be transmitted from the computer 42 using a wireless USB signal or other wireless communications means. As with other audio information, the file may be transmitted as analog or digital data to the remote 30*a*, 30*b*, or 30*c*. In some embodiments, audio clips are able to be stored on the remote 30*a*, 30*b*, or 30*c* rather than streaming them from the computer 42 each time the audio clip is played.

The remotes 30*a*, 30*b*, and 30*c* also may be able to function as wireless computer mouse and cursor movement devices for a cursor displayed on the computer 42, or the remotes 30*a*, 30*b*, and 30*c* may be able to identify and display alerts for WiFi hotspot locations. In some embodiments, the remotes 30*a*, 30*b*, and 30*c* identify the best WiFi access point to use based on signal strength, signal traffic, and/or other factors. The remotes 30*a*, 30*b*, and 30*c* also may have all or a portion of the buttons and other features illuminated by backlighting for easier visibility.

Figure 2:
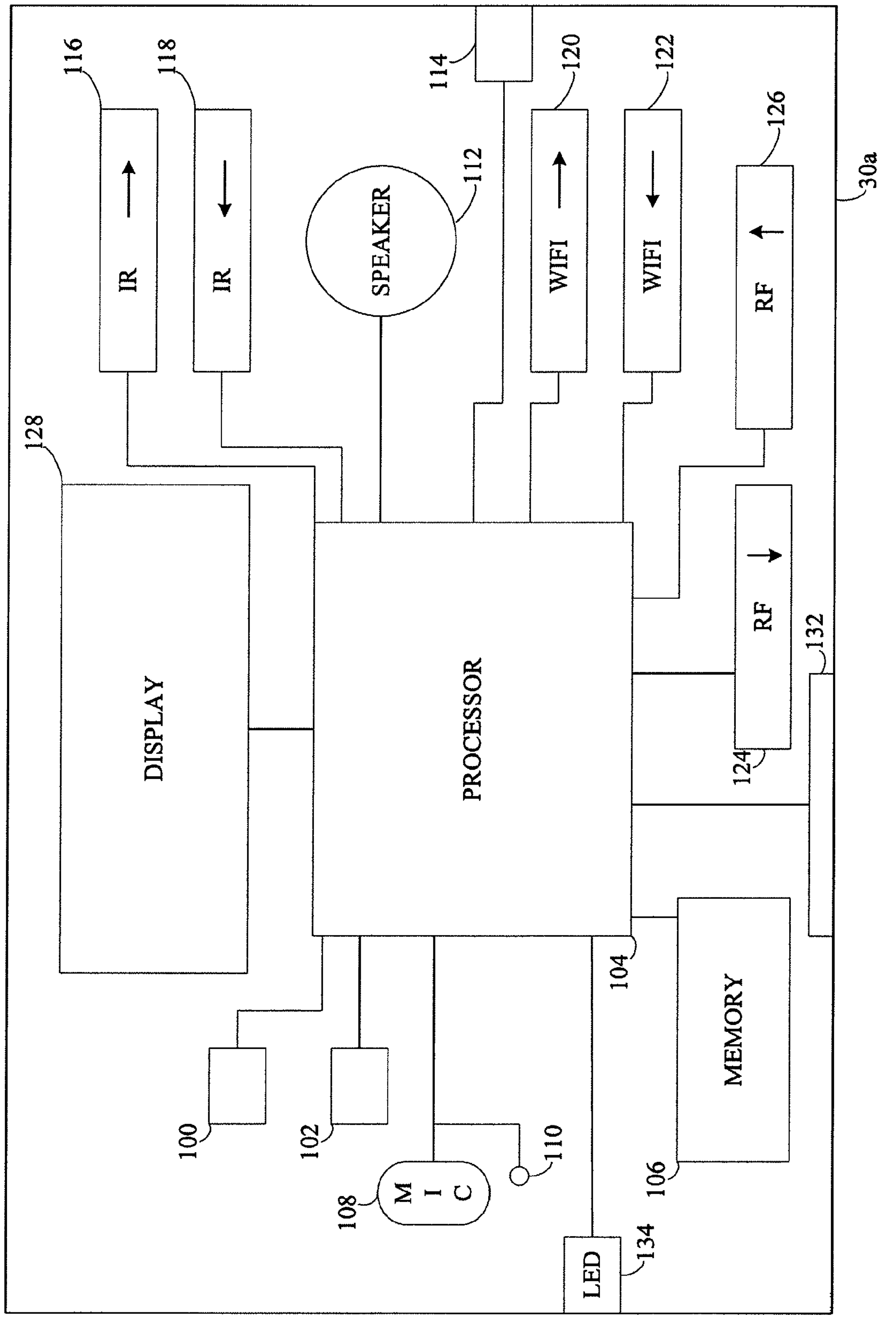
FIG. 2 is a schematic diagram showing additional detail for the first remote shown in FIG. 1.

FIG. 2 is a schematic diagram showing additional detail for one of the remotes shown in FIG. 1. The remote 30*a* includes a processor 104 in communication with a first button 100 and a second button 102. Although only two buttons are shown in the diagram for clarity, it should be understood that more than two buttons may be present. In addition, the remote control 30*a* also has a memory 106 in data communication with the processor 104 as well as an integrated microphone 108, an audio-in jack 110, an integrated speaker 112, and an audio-out jack 114, all being electrically linked to the processor 104. In addition, the first remote 30*a* includes a variety of communications means such as an optical transmitter 116 and an optical receiver 118, for example, an infrared transmitter and receiver. The transmitter 116 could be used to send signals to home electronics devices and the receiver 118 could be used for instance to receive signals that allow the remote 30*a* to be programmed using a standard remote that may have originally been included with a home electronics device.

The first remote 30*a* also includes a WiFi transmitter 120 and a WiFi receiver 122 which are used to communicate with the WiFi transceiver 44 of the computer 42 shown in FIG. 1. In addition, the remote 30*a* may include an additional RF transmitter 124 and an additional RF receiver 126, that are used for analog audio transmissions or for other communications via a proprietary network, such as with other components of the home automation network 74 for example. Although not shown, the remote 30*a* may also be equipped with a wireless USB transceiver that could be used to communicate with a computer which is also equipped with a wireless USB transceiver. Optionally, the first remote 30*a* may include a display 128 in data communication with the processor 104. The display 128 displays a variety of alerts received by the computer 42 or displays menus to be used in controlling the various home electronics devices. If the cradle 80 were to be used, the remote includes a cradle connector 132 which would allow for electrical connection of the audio-out signal for transmission to the speakers 82*a* and 82*b* as well as possibly a power input connection to recharge the batteries of the remote. The first remote 30*a* is shown to also include an LED 134 which is electrically connected to the processor 104. Although only one LED is shown, it should be understood that more than one may be present in some embodiments of the invention.

Figure 3:
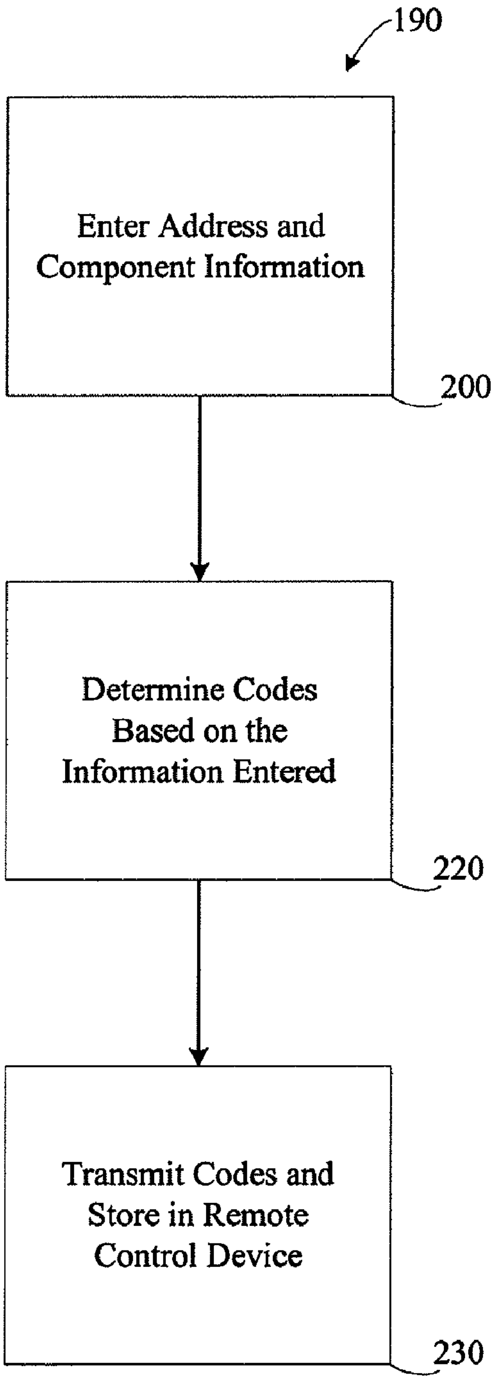
FIG. 3 is a flowchart for a method of programming buttons on a remote in accordance with an embodiment of the invention.

FIG. 3 is a flowchart for a method 190 of programming buttons on a remote in accordance with an embodiment of the invention. The remote 30*a* shown in FIGS. 1 and 2 may come with a plurality of buttons which are prelabeled in advance with commonly used television program networks such as CNN, HBO, Disney, MTV, and Discovery Channel. Additionally, other labels could be added to user configurable buttons which indicate networks that are commonly watched by the user of the remote. This allows commonly used networks to be selected with the push of a single button rather than by entering multiple channel numbers or by scrolling through a programming menu. However, the channels for programming networks such as CNN and Disney vary based upon cable or satellite provider and at least in the case of cable services by geographic location. Additionally, once a channel is known, the correct codes for the electronic device to be used that correspond to the channel must be determined. These single press programming network buttons along with other buttons on the remote could be programmed using the method 190 shown in FIG. 3.

The method 190 begins at a block 200 where location and electronic component information is entered into the computer 42 used to program the remote. In one embodiment, this step could be triggered by a user placing batteries into the remote and bringing it near enough to the computer 42 to be within wireless reception range. In one embodiment, the location information may be obtained by address entry during a registration process for the remote. The block 200 is followed by a block 220, where the proper codes are determined based on the entered location and component information. Next, at a block 230, the proper codes are transmitted and stored in the remote.

Figure 4:
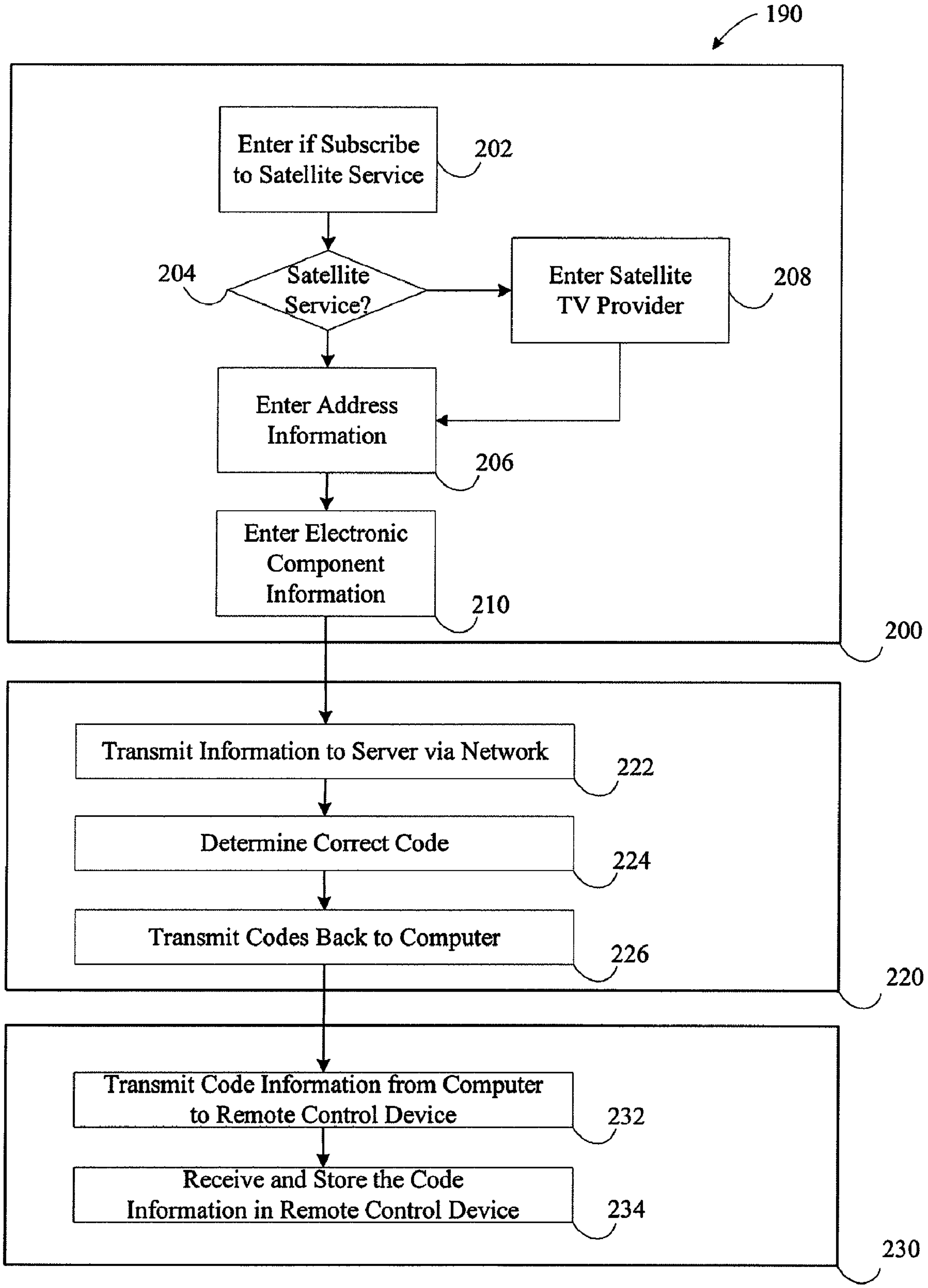
FIG. 4 is a flowchart showing additional detail for an example embodiment of the method shown by the flowchart in FIG. 3.

FIG. 4 is a flowchart showing additional detail for an example embodiment of the method 190 shown by the flowchart in FIG. 3. The block 200 includes a block 202, where a user enters whether they use cable or satellite service. Next, a decision block 204 determines whether the user had entered they have satellite service. If the user indicated they have satellite service, at a block 208 the user enters their satellite television provider. Next, at a block 206, the user enters address information. Block 206 is also performed after the block 204 if the user had indicated they do not have satellite television service. Following the block 206, at a block 210, electronic component information is entered. This information could be entered directly with information such as manufacturer, model number, and type of device or it could be entered using a menu driven system. For example, in one embodiment, the remote 30*a*, 30*b*, or 30*c* contains an extensive code library and a user enters a 3 digit or 4 digit code to represent the band and model of a device to be controlled. In another embodiment, remote to remote IR signal learning is used in cases where the code for the user's product is not found in the code library or in cases where the user wants the remote 30*a*, 30*b*, or 30*c* to learn a Smart Macro. The block 210 is the final block within the block 200 of entering location and component information in this example.

The block 220 where the proper codes are determined based on the entered location and component information is shown to be composed of three more detailed blocks. At a block 222, the information entered at block 200 is transmitted to a server via a network. If the example environment shown in FIG. 1 were used, this step would occur by the computer 42 transmitting the entered information to the server 64 via the network 62. Following the block 222, at a block 224, the correct code information is retrieved by the computer 42 by using the received information to look up the correct signals in a database or table either stored on the computer 42 or on a remote server accessed via the network 62. Next, at a block 226, the code information is transmitted back to the computer 42. The codes may simply be proper channels for programming networks in some cases, but could include specific key or IR signal information in other cases.

The block 230, where the proper codes are transmitted to and stored in a remote, is shown to be composed of two more detailed blocks. At a block 232, the code information received by the computer 42 which was transmitted in the block 226 is transmitted to the remote 30*a*, 30*b*, or 30*c*. This transmission may take place via WiFi, Bluetooth, or other wireless or wired transmission means. Next, at a block 234, the codes are received and stored by the remote 30*a*, 30*b*, or 30*c*. Although not shown, some embodiments may also include automatic updating processes where the computer 42 will continue to check for updated codes on a periodic basis and download them to the remote 30*a*, 30*b*, or 30*c* when changes occur.

Alternatively, some or all of the codes could be determined by the computer 42 accessing local cable guides via a network such as the Internet based on the user's zipcode rather than by sending information to a centralized database server holding information for all areas. In addition, even if information is transmitted to a centralized server for determination of the proper codes, that server may query other servers via a network to receive part or all of the code information needed rather than storing all of the relevant information on the server itself. It would also be possible for a user to simply enter the correct channels for programming networks when prompted during setup of the remote as well. Codes and channel numbers can be used interchangeably or in combination depending on the desired embodiment of the invention.

Figure 5:
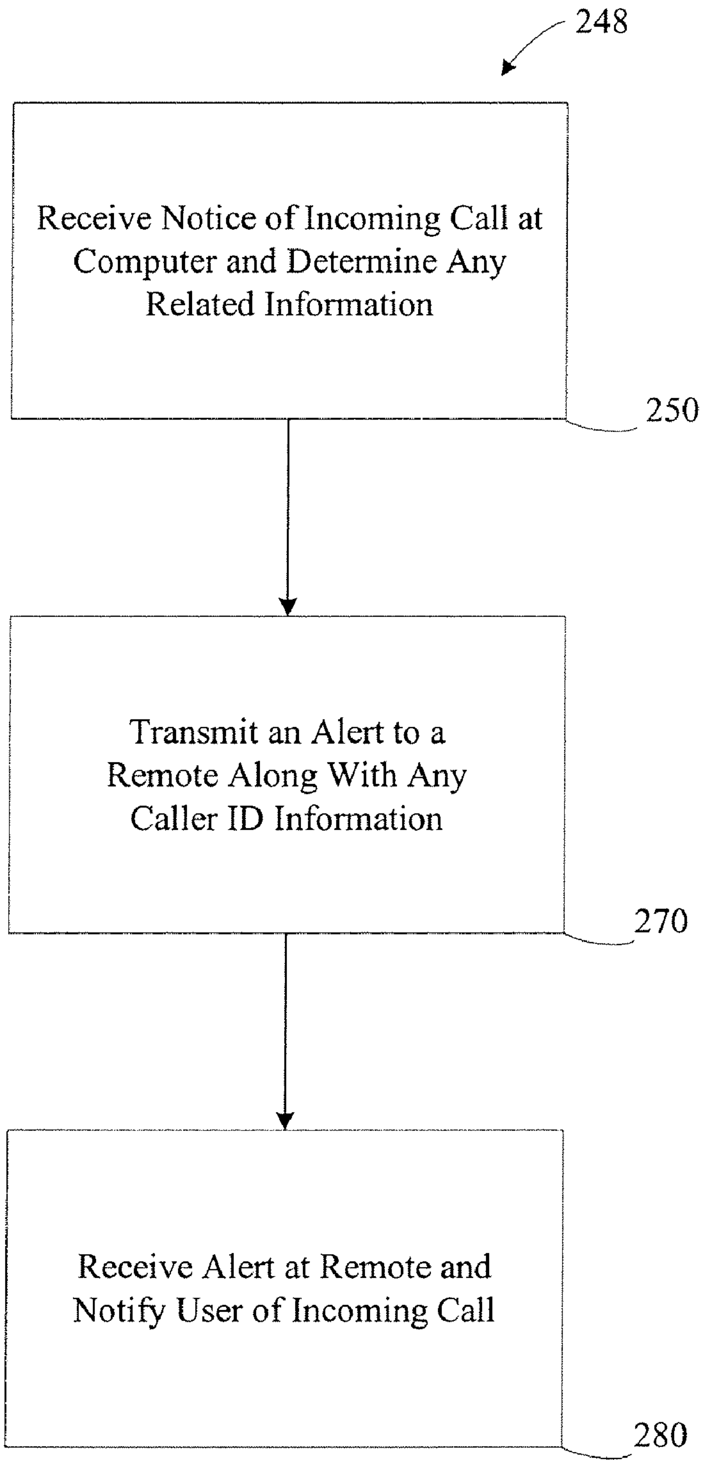
FIG. 5 is a flowchart for a method of notifying a user of an incoming Internet Protocol telephone call.

FIG. 5 is a flowchart for a method 248 of notifying a user of an incoming Internet Protocol telephone call. The method begins at a block 250 where a notice of an incoming call and/or an actual call is received at the computer 42 via the network 62 and any information related to the calling party is determined based on identifying information contained in the incoming call data stream. Next, at a block 270, an alert is transmitted by the computer 42 to a remote along with any related caller ID information that was contained in the original data stream or determined based on information contained in the data stream. Finally, at a block 280, the alert transmitted in the preceding block is received at the remote and the user is notified of the incoming call.

Figure 6:
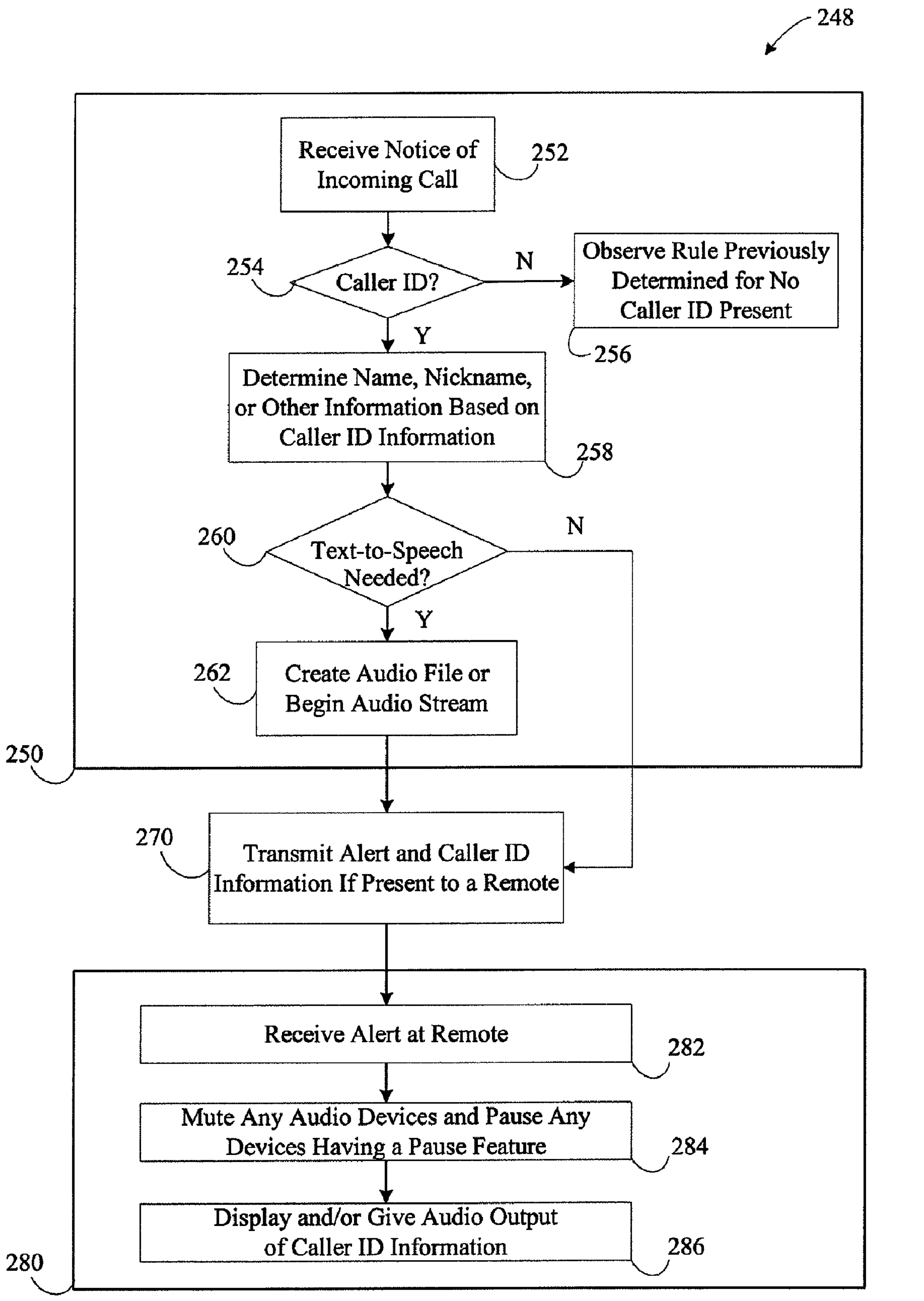
FIG. 6 is a flowchart showing additional detail for an example embodiment of the method shown by the flowchart in FIG. 5.

FIG. 6 is a flowchart showing additional detail for an example embodiment of the method 248 shown by the flowchart in FIG. 5. The block 250 is shown to include a series of steps in this example. First, at a block 252, the computer receives notice of an incoming call by a data stream coming in via the network. Next, at a decision block 254, the data stream of the incoming call is examined to determine whether caller identification (caller ID) information is present. If caller ID information is not present, the call is routed at a block 256 according to the direction of a previously determined rule for handling calls with no caller ID information present. The previously determined rule could direct these calls to voicemail or refuse to answer them for example. Alternatively, the previously determined rule could direct the computer to handle these type of calls normally, with an alert being sent to the remote, but without caller ID information present. If caller ID information was determined to be present at the decision block 254, other related information is determined at a block 258. This information could include a name, nickname, or handling rule for the particular caller associated with the included caller ID, for example. Next, at a decision block 260, a determination is made as to whether text-to-speech conversion is required. This determination would likely be made based on whether the remote to which the alert was being sent had a display. If the remote did not have a display, text-to-speech conversion would be used to alert the user of the caller ID information using the integrated speaker or the audio out connection. If text-to-speech conversion is needed, the relevant caller ID information is converted to an audio file or the beginning of an audio data stream at a block 262. The block 262 is followed by the block 270, which is also the block following the decision block 260 if text-to-speech conversion is not required. At the block 270, as described for FIG. 3, an alert and caller ID information, if present, is transmitted to the remote.

The block 280, where the alert transmitted in the preceding block is received at the remote and the user is notified of the incoming call, is shown to be composed of three more detailed blocks. At a block 282, the alert and caller ID information transmitted in the block 270 are received at the remote. Next, at a block 284, any audio devices directly connected to the remote or associated with the home electronics devices are muted by the remote and any devices having a pause function are paused by the remote. This is followed by a block 286 where the alert is given in a previously determined manner and the caller ID information is displayed or the created audio file is outputted. Examples of previously determined alert types could include particular ring tones, displays, or speech. As previously mentioned, the caller ID information could be presented in visual form if the remote included an LCD display and could be presented as speech by receiving and playing the audio created by the text-to-speech functionality of the computer.

Figure 7:
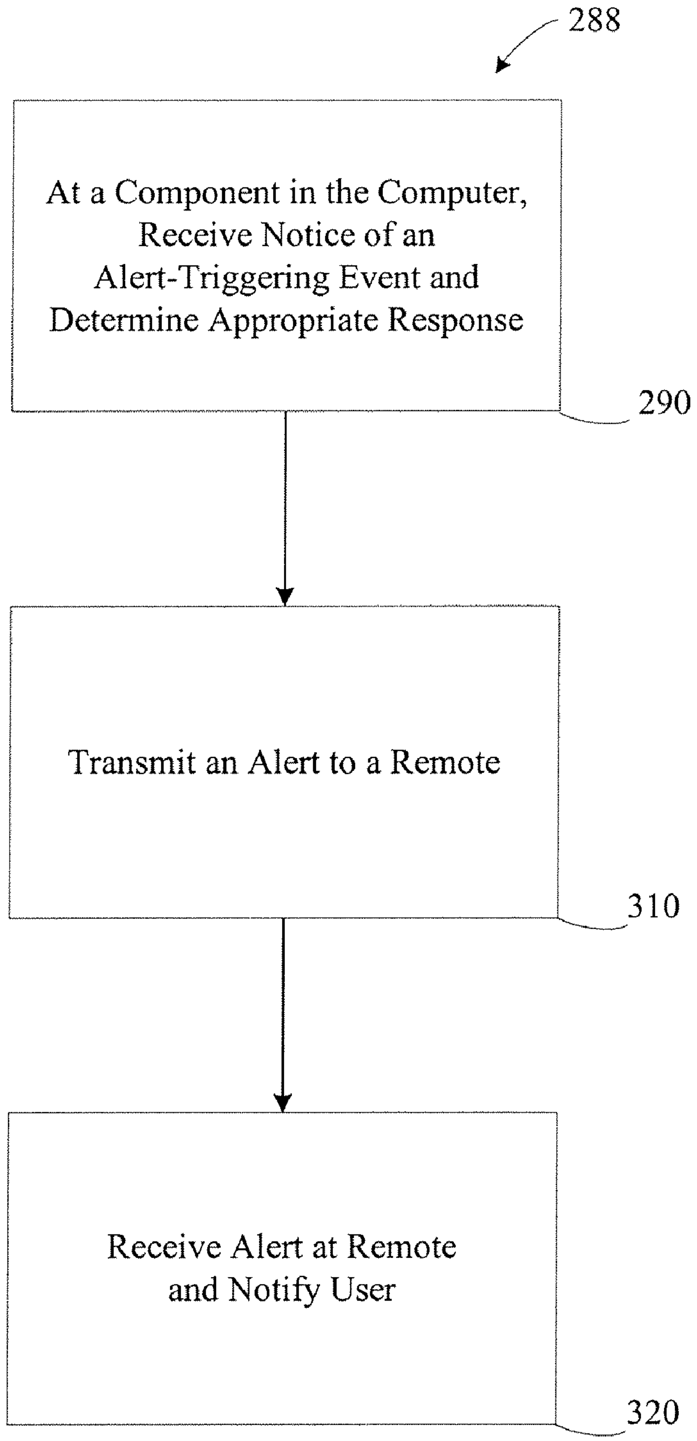
FIG. 7 is a flowchart for a method of alerting a user via a multifunctional two-way remote.

FIG. 7 is a flowchart for a method 288 of alerting a user via a multifunctional two-way remote. At a block 290, a notice is received of an alert-triggering event at a component in the computer from either an internally generated event or an externally generated event, and an appropriate response is determined by the computer. Alert triggering events might take many forms, as mentioned in the description for FIG. 1. By way of example, these could include both internal alert triggering events, such as calendar meeting alerts and countdown timers or external alert triggering events such as emails received meeting certain criteria and news, weather, auction, and stock updates that are received at the computer via a network. The appropriate response could be determined based on the type of alert-triggering event and user information related to the person operating the remote. Next, at a block 310, the proper alert is transmitted by the computer to the remote. Next at a block 320, the alert is received by the remote and the proper notification is displayed or played so the user can be notified of the alert-triggering event.

Figure 8:
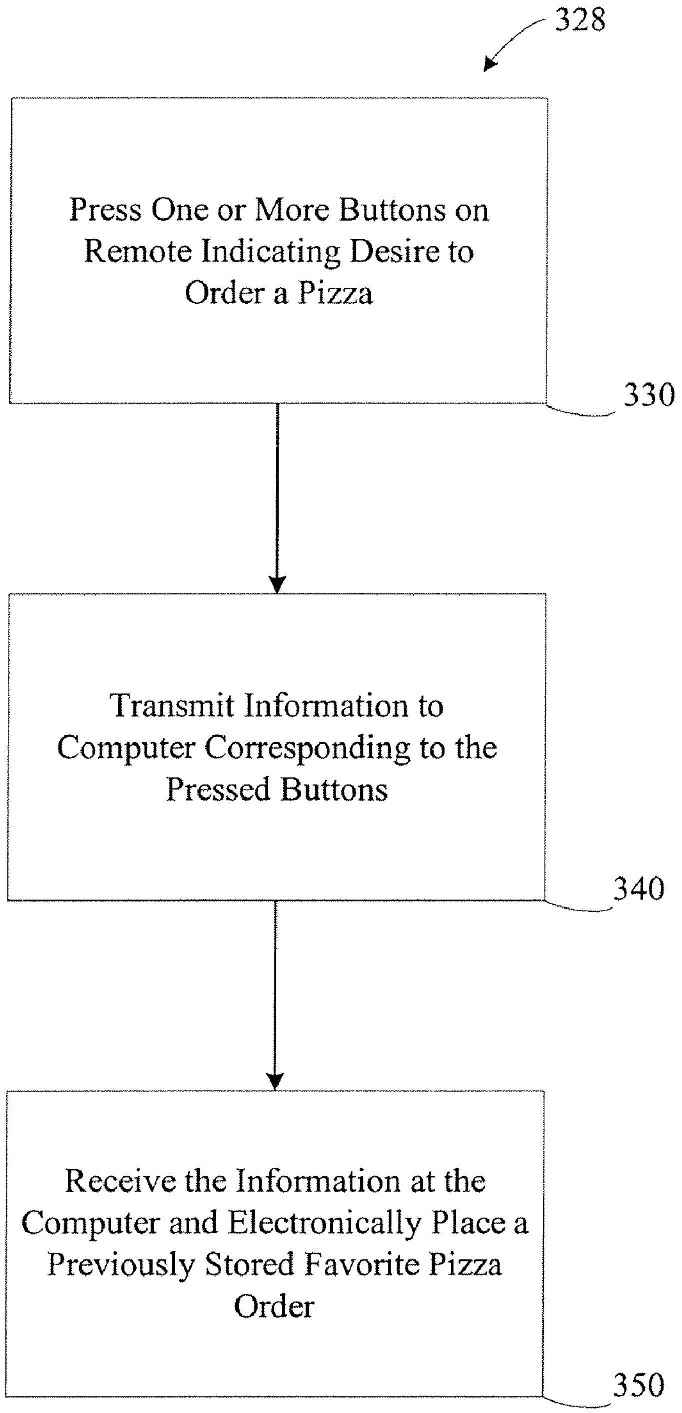
FIG. 8 is a flowchart for a method of ordering a pizza using a multifunctional two-way remote.

FIG. 8 is a flowchart for a method 328 of ordering a pizza using a multifunctional two-way remote. The method 328 begins at a block 330, where one or more buttons are pressed on the remote indicating that the user desires to order a pizza. Next, at a block 340, information corresponding to the pressed buttons is transmitted to the computer. Then, at a block 350, the information is received at the computer and a previously stored favorite pizza order is electronically placed with a pizza delivery service.

Figure 9:
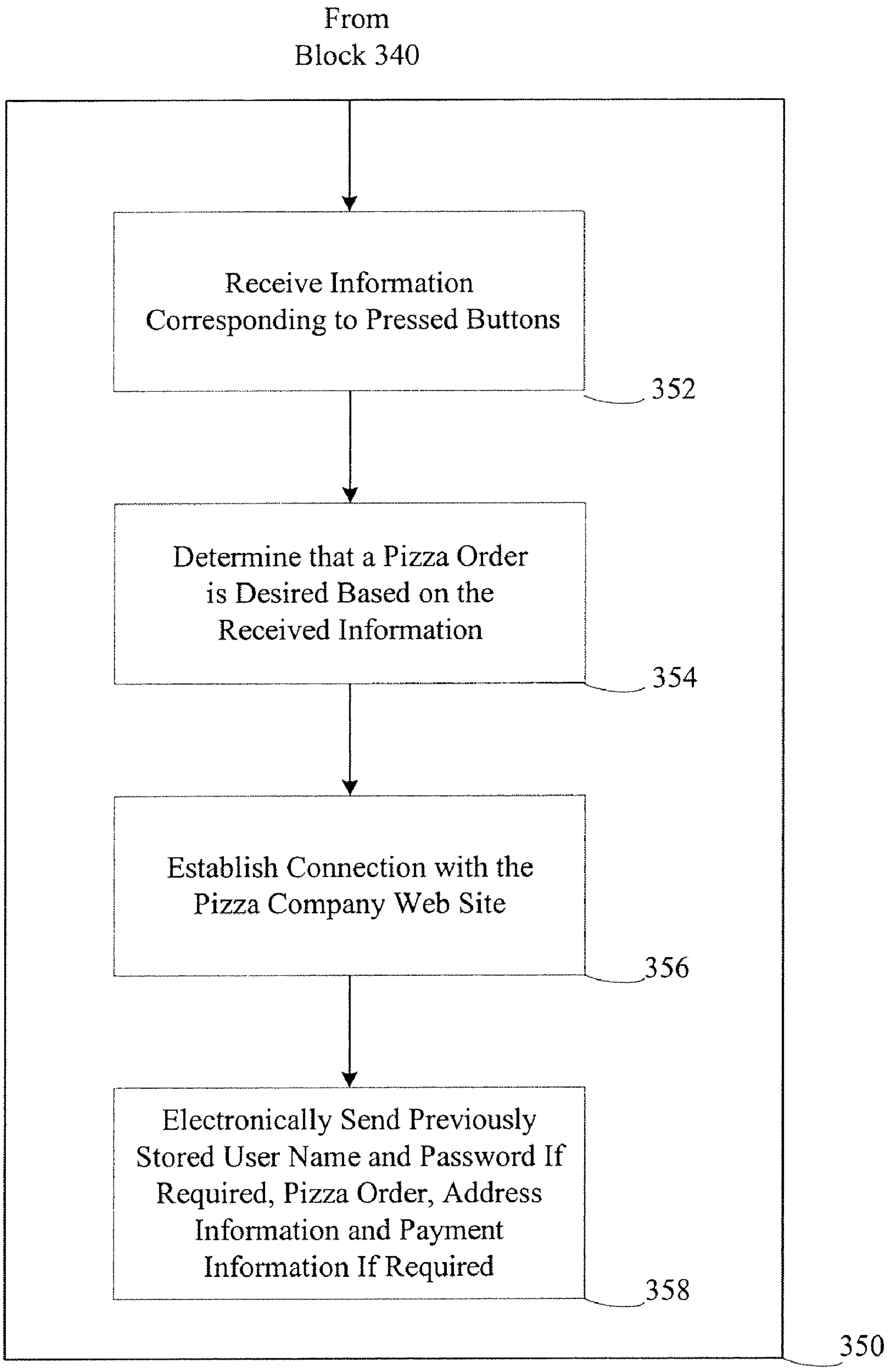
FIG. 9 is a flowchart for an example embodiment of the method shown by the flowchart in FIG. 8, but showing additional detail for one of the steps.

FIG. 9 is a flowchart showing additional detail for an example embodiment of the block 350 from the method 328 shown by the flowchart in FIG. 8. The block 350 is shown to include a number of more detailed blocks. First, at a block 352, information corresponding to the pressed buttons that was transmitted in the block 340 is received at the computer. Next, at a block 354, it is determined by the computer that a pizza order is desired based on the received information. Then, at a block 356, a connection with a pizza delivery service web site is established. Finally, at a block 358, previously stored information relating to the pizza order is electronically sent to the pizza delivery service's web site. This information can include a username and password if required, the pizza order itself, address information if it has not already been stored and identified in another manner by the pizza delivery service, and payment information if required. Alternatively, as mentioned in the description for FIG. 1, information may be emailed to the pizza delivery service or sent in another electronic fashion, such as by fax, rather than being sent via web site interaction. Additionally, the information could be transmitted via IP telephony using Skype, for example, from the remote 30*a*, 30*b*, or 30*c* in some embodiments.

Figure 10:
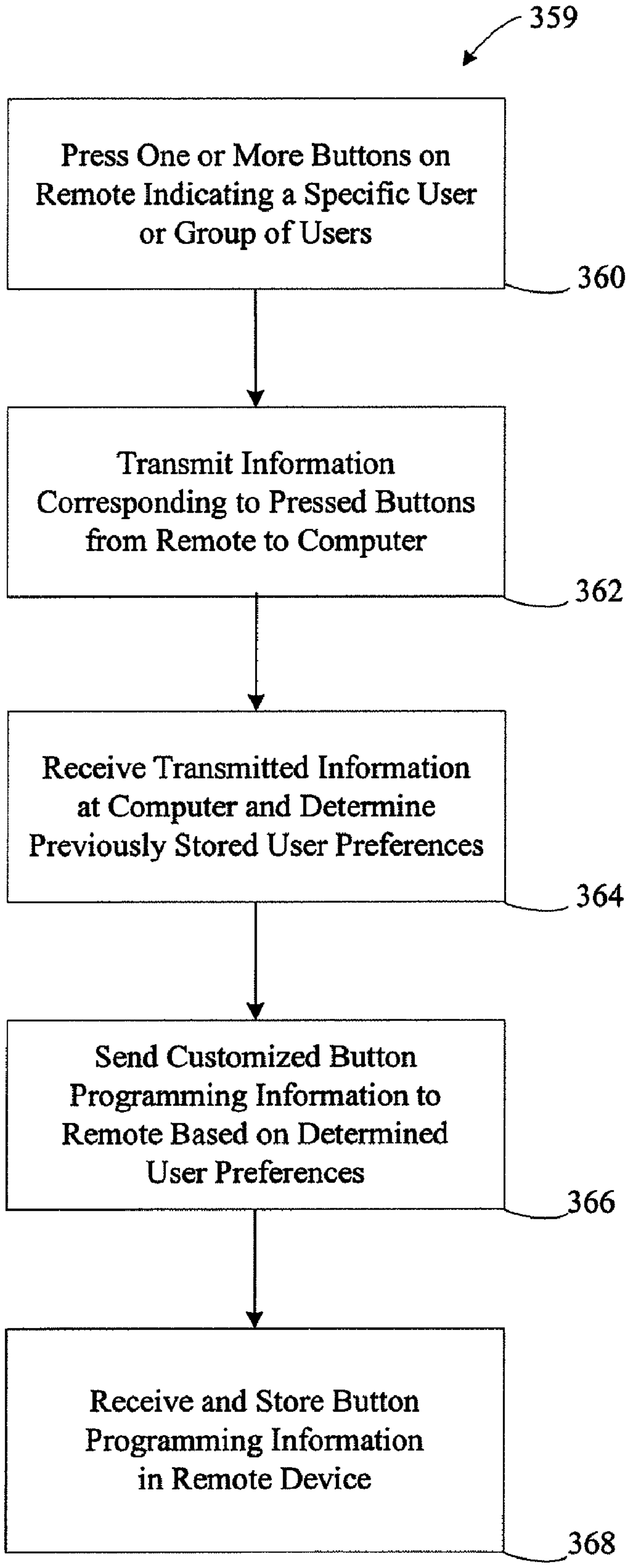
FIG. 10 is a flowchart for a method of programming a remote based on user preferences.

FIG. 10 is a flowchart for a method 359 of programming a remote based on user preferences. The method 359 begins at a block 360, where one or more buttons are pressed on a remote indicating a specific user or group of users. For example, a first family member might indicate that the remote 30*a* is being used by the first family member by pressing a first sequence of buttons on the remote 30*a*. As an additional example, a parent might indicate that the remote 30*b* is to be used by children by pressing a second sequence of buttons on the remote 30*b*. Next, at a block 362, information corresponding to the pressed buttons is transmitted from the remote to the computer. This is followed by a block 364, where the transmitted information is received at the computer and previously stored user preferences are determined based on the received information. Then, at a block 366, customized button programming information is sent to the remote based on the determined user preferences. The customized button programming includes the ability to map the same keys on the remote to different functions for different users. Finally, at a block 368, the button programming information is received and stored by the remote. Many variations on the steps described above can be envisioned which would accomplish the same result of allowing the remote to have differing button functionality for different users. For example, the process could be initiated during initial programming of the remote at the computer rather than by pressing one or more buttons on the remote. It would also be possible for button programming information for all users to be stored in the remote during initial programming, with only one set of programming preferences available at any one time. In this case, entering user identifying information on the remote would simply switch to the relevant set of previously stored programming preferences. The steps within each block could also be implemented in various ways. For example, the determining previously stored user preferences portion of the step shown in the block 364 could take place by the computer accessing a database, a simple table, or by sending a query to a remote network server where the information had been stored rather than residing on the computer itself.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A remote control device comprising:

a radiofrequency (RF) transmitter;

a RF receiver;

an optical transmitter;

a memory unit;

a processor in data communication with the memory unit, the RF transmitter, the RF receiver, and the optical transmitter; and an operator interface including at least one button, the operator interface in data communication with the processor, wherein the memory unit comprises stored programming instructions operable by the processor, the programming instructions comprising:

a first component configured to cause the RF transmitter to send at least one previously stored code to a computer in response to the activation of the at least one button;

a second component configured to receive an input instruction at the RF receiver, the input instruction being sent from the computer in response to the transmitted at least one code;

a third component configured to receive the input instruction and cause the optical transmitter to emit at least one signal to a device, the at least one signal being based upon the input instruction received by the RF receiver; and a fourth component configured to cause the RF transmitter to send a zip code or other geographic indicator to the computer, and a fifth component to receive from the computer, responsive to the sending of the geographic indicator, a plurality of optical codes to be used by the remote control device to associate the operator interface with the plurality of optical codes, wherein the optical codes are associated with the geographic indicator.

2. The remote control device of claim 1, further comprising:

a microphone in data communication with the processor; and a speaker in data communication with the processor, wherein the programming instructions further include:

a sixth component configured to instruct the speaker to emit sound in response to an audio signal received by the RF receiver from the computer; and a seventh component configured to instruct the RF transmitter to send audio information in response to a signal generated by the microphone.

3. The remote control device of claim 1, wherein the at least one button is activated during a first television program on a first channel, wherein an RF signal is received at the end of the first television program, and wherein the IR signal instructs the device to change to a second channel.

4. The remote control device of claim 3, wherein the at least one button is activated by pressing a designated channel button twice.

5. The remote control device of claim 1, wherein the programming instructions further include a sixth components configured to direct the processor to:

receive an alert signal from the computer, the alert signal based on an event sensed by a sensor in signal communication with the computer; and perform an action based on the received alert signal.

6. The remote control device of claim 5, wherein the sensor is a motion sensor and wherein the programming instructions include a seventh components configured to instruct the processor to direct the optical transmitter to emit an optical signal based on the alert signal that causes the device to display an image from a security camera.

* * * * *